US010757446B2

(12) United States Patent
Ogasawara

(10) Patent No.: US 10,757,446 B2
(45) Date of Patent: Aug. 25, 2020

(54) DATA COMPRESSION APPARATUS AND DATA COMPRESSION METHOD

(71) Applicant: FUJITSU LIMITED, Kawasaki-shi, Kanagawa (JP)

(72) Inventor: Yoshiaki Ogasawara, Hino (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 16/252,936

(22) Filed: Jan. 21, 2019

(65) Prior Publication Data

US 2019/0230380 A1 Jul. 25, 2019

(30) Foreign Application Priority Data

Jan. 25, 2018 (JP) ................................. 2018-010148

(51) Int. Cl.
*H04N 19/18* (2014.01)
*H04N 19/60* (2014.01)
*G06F 17/14* (2006.01)

(52) U.S. Cl.
CPC ........... *H04N 19/60* (2014.11); *G06F 17/141* (2013.01); *G06F 17/147* (2013.01); *H04N 19/18* (2014.11)

(58) Field of Classification Search
CPC ...... H04N 19/18; H04N 19/60; G06F 17/141; G06F 17/147
See application file for complete search history.

(56) References Cited

U.S. PATENT DOCUMENTS

| 2003/0040876 A1* | 2/2003 | Rao ....................... G06F 17/141 702/76 |
| 2006/0047452 A1* | 3/2006 | Shim ..................... G06F 17/141 702/77 |
| 2006/0290706 A1* | 12/2006 | Garoutte ................ G09B 29/12 345/582 |
| 2006/0291733 A1* | 12/2006 | Falzon ................... H04N 19/61 382/240 |
| 2008/0123949 A1* | 5/2008 | Kwon ...................... H04N 1/60 382/167 |
| 2008/0159442 A1* | 7/2008 | Tanabe ................ H04L 27/3863 375/324 |
| 2009/0073284 A1* | 3/2009 | Isogawa ................. H04N 9/045 348/231.99 |
| 2011/0131044 A1* | 6/2011 | Fukuda .................... G10L 15/20 704/246 |

(Continued)

FOREIGN PATENT DOCUMENTS

JP H09-044519 A 2/1997
JP H10-187978 A 7/1998

*Primary Examiner* — Dominic E Rego
(74) *Attorney, Agent, or Firm* — Fujitsu Patent Center

(57) ABSTRACT

A processor calculates, from image data, a plurality of first coefficients corresponding to different frequencies using a Fourier transform and stores first frequency domain data, from which first coefficients whose magnitude is below a threshold have been excluded, in a memory. The processor also calculates, from kernel data, second coefficients of frequencies corresponding to the first coefficients indicated by the first frequency domain data using a Fourier transform and stores second frequency domain data in the memory. The processor uses the first frequency domain data, the second frequency domain data, and an inverse Fourier transform to generate a feature map indicating a result of applying the kernel data to the image data.

7 Claims, 13 Drawing Sheets

(56) References Cited

U.S. PATENT DOCUMENTS

| | | | |
|---|---|---|---|
| 2011/0206289 A1* | 8/2011 | Dikbas | H04N 19/147 382/238 |
| 2012/0331278 A1* | 12/2012 | Breternitz | G06F 9/5027 712/236 |
| 2015/0010250 A1* | 1/2015 | Omi | G06T 5/003 382/275 |
| 2015/0215625 A1* | 7/2015 | Huang | H04L 67/02 382/239 |
| 2017/0011006 A1* | 1/2017 | Saber | G06F 17/153 |
| 2017/0118491 A1* | 4/2017 | Togita | H04N 19/127 |
| 2017/0359579 A1* | 12/2017 | Miyauchi | H04N 19/124 |
| 2018/0176604 A1* | 6/2018 | Chesnokov | H04N 19/36 |
| 2018/0293707 A1* | 10/2018 | El-Khamy | G06T 3/4069 |

* cited by examiner

RAM

FFT PARAMETERS  — 133

| N | a | W(a,N) |
|---|---|---|
| 244 | 0 | 1.0000−0.0000i |
| 244 | 1 | 0.9997−0.0257i |
| 244 | 2 | 0.9987−0.0515i |
| ... | ... | ... |

IFFT PARAMETERS  — 134

| N | a | $W^{-1}(a,N)$ |
|---|---|---|
| 244 | 0 | 1.0000+0.0000i |
| 244 | 1 | 0.9997+0.0257i |
| 244 | 2 | 0.9987+0.0515i |
| ... | ... | ... |

FIG. 8

DATA COMPRESSION APPARATUS AND DATA COMPRESSION METHOD

CROSS-REFERENCE TO RELATED APPLICATION

This application is based upon and claims the benefit of priority of the prior Japanese Patent Application No. 2018-010148, filed on Jan. 25, 2018, the entire contents of which are incorporated herein by reference.

FIELD

The embodiments discussed herein are related to a data compression apparatus and a data compression method.

BACKGROUND

During image processing, such as image recognition, image classification, and image searches, a process called "convolution" may be performed to extract features of the target image. Convolution is a sum-of-products operation in which a kernel corresponding to a feature to be extracted is superimposed and applied to the target image while being moved in parallel across the target image. Through convolution, a feature map is generated from the target image and the kernel being used. One element in the feature map is calculated by superimposing the kernel on a partial region that is centered on one element in the target image and summing the products of the corresponding elements in the partial region and the kernel.

However, in place of the fundamental computation method described above, convolution may also be performed via an alternative computation method that uses a Fourier transform. In this alternative computation method, the target image and the kernel are both converted into frequency domain data by way of a Fourier transform, and corresponding elements in the frequency domain data of the target image and the frequency domain data of the kernel are then multiplied. After this, the multiplication results are converted into spatial domain data by an inverse Fourier transform. According to the convolution theorem, the spatial domain data outputted by this alternative computation method will match the feature map outputted by the fundamental computation method. The alternative computation method may be executed at higher speed than the fundamental computation method.

An image searching apparatus that, searches for a desired image from compressed image data has been proposed. The proposed image searching apparatus separates a direct current (or "DC") component of each block from image data that was compressed using a discrete cosine transform (or "DCT"). Based on the separated DC component, the image searching apparatus extracts blocks that satisfy an inputted search condition and restores a bitmap image from the extracted blocks using an inverse discrete cosine transform (or "IDCT"). When the restored bitmap image satisfies the search condition, the image searching apparatus outputs the image as the search result.

A component shape recognizing method that recognizes the shapes of components from compressed image data has also beer, proposed. The proposed component shape recognizing method extracts partial images in which an edge or corner of a component appears, performs a discrete cosine transform on the extracted partial images, and generates compressed data from which coefficients of high frequency components have been excluded. The compressed data is inputted into a neural network, which has been trained in advance through supervised learning, and edge or corner shapes are recognized.

See, for example, Japanese Laid-open Patent Publication No. 09-44519 and Japanese Laid-open Patent Publication No. 10-187978.

During convolution using the Fourier transform described above, in the process that generates a feature map from the target image and a kernel, frequency domain data corresponding to the target image and frequency domain data corresponding to the kernel are generated and a multiplication result of both data is generated. This means that there is the problem of an increase in the amount of data stored during the convolution operation, and for a neural network with multiple layers, an increase in memory consumption.

SUMMARY

According to one aspect, there is provided a data compression apparatus including: a memory that stores image data and kernel data to be applied to the image data; and a processor that executes a process including: calculating, from the image data, a plurality of first coefficients corresponding to different frequencies using a Fourier transform; storing first frequency domain data, which indicates a subset of the plurality of first coefficients from which one or more first coefficients of a magnitude below a threshold have been excluded, in the memory; calculating, from the kernel data, second coefficients of frequencies corresponding to the subset of the plurality of first coefficients indicated by the first frequency domain data using a Fourier transform; storing second frequency domain data indicating the second coefficients in the memory; and generating a feature map indicating a result of applying the kernel data to the image data using the first frequency domain data, the second frequency domain data, and an inverse Fourier transform.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a second diagram depicting an example data structure;

DESCRIPTION OF EMBODIMENTS

Figure 1:
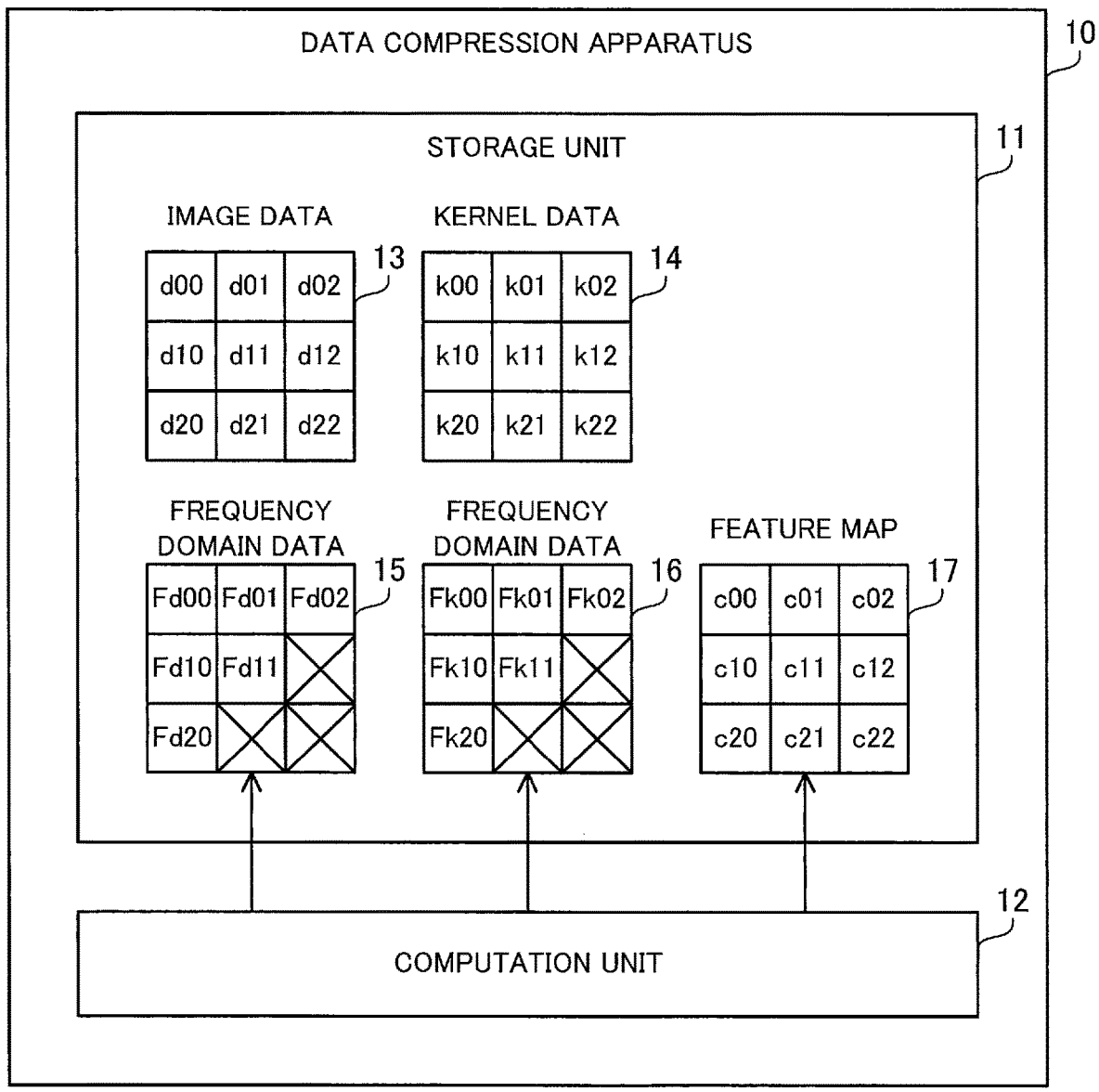
FIG. 1 depicts a data compression apparatus according to a first embodiment.

Several embodiments will be described below with reference to the accompanying drawings, wherein like reference numerals refer to like elements throughout.

First Embodiment

A first embodiment will now be described.

FIG. 1 depicts a data compression apparatus according to the first embodiment.

The data compression apparatus 10 according to the first embodiment performs a convolution operation on image data. The data compression apparatus 10 may be a general-purpose computer, such as a client computer or a server computer, or may be an embedded system or dedicated hardware.

The data compression apparatus 10 includes a storage unit 11 and a computation unit 12. As one example, the storage unit 11 is a semiconductor memory such as RAM (Random Access Memory). The compilation unit 12 is a processor, a processor core, or a group including a plurality of processors or processor cores (a so-called "multiprocessor"). The computation unit 12 may include a semiconductor device such as an FPGA (Field-Programmable Gate Array) or an ASIC (Application Specific Integrated Circuit).

The storage unit 11 stores image data 13 and kernel data 14. As one example, the image data 13 represents an image captured by an image capture apparatus. The image data 13 includes a plurality of elements (such as pixels) whose positions are specified by two-dimensional coordinates, for example. The kernel data 14 is data to be applied to the image data 13 during convolution. The kernel data 14 is prepared in advance corresponding to a feature to be extracted from the image data 13, such as edges. As one example, the kernel data 14 includes a plurality of elements whose positions are specified by two-dimensional coordinates, for example.

The computation unit 12 performs a convolution operation using the image data 13 and the kernel data 14 stored in the storage unit 11. The computation unit 12 generates frequency domain data 15 from the image data 13 using a Fourier transform and stores the frequency domain data 15 in the storage unit 11. The frequency domain data 15 represents a subset of a plurality of first coefficients corresponding to different frequencies calculated by a Fourier transform. First coefficients whose magnitude is below a threshold are excluded from the frequency domain data 15. As one example, the frequency domain data 15 includes only first coefficients with a magnitude equal to or above a threshold, out of the first coefficients calculated by the Fourier transform. First coefficients whose magnitude is below the threshold are regarded as a predetermined value, such as zero. Here, it can be said that the first coefficients whose magnitude is below the threshold have been approximated to the predetermined value (for example, rounded down to zero).

The computation unit 12 also generates frequency domain data 16 from the kernel data 14 using a Fourier transform and stores the frequency domain data 16 in the storage unit 11. The frequency domain data 16 represents at least some out of a plurality of second coefficients corresponding to different frequencies calculated by the Fourier transform. The frequency domain data 16 includes at least second coefficients of frequencies corresponding to the first coefficients indicated by the frequency domain data 15. Second coefficients for frequencies corresponding to the first coefficients that have been excluded from the frequency domain data 15 may be excluded from the frequency domain data 16. The computation unit 12 may also suppress computation from the kernel data 14 of second coefficients that are to be excluded from the frequency domain data 16.

The computation unit 12 uses the frequency domain data 15 and 16 stored in the storage unit 11 and an inverse Fourier transform to generate a feature map 17 indicating the result of convolution on the image data 13 and the kernel data 14, and stores the feature map 17 in the storage unit 11. When doing so, it is conceivable to regard first coefficients that are not included in the frequency domain data 15 as a predetermined value, such as zero. The feature map 17 represents features that have been extracted from the image data 13 according to the kernel data 14. As one example, the feature map 17 includes a plurality of elements whose positions are specified by two-dimensional coordinates.

When generating the feature map 17 from the frequency domain data 15 and 16, as one example, the computation unit 12 generates other frequency domain data from the frequency domain data 15 and 16. As one example, this other frequency domain data is generated by multiplying corresponding coefficients in the frequency domain data 15 and the frequency domain data 16. At this time, computation relating to the first coefficients not included in the frequency domain data 15 may be omitted. The computation unit 12 generates the feature map 17 from the generated other frequency domain data using an inverse Fourier transform.

With the data concession apparatus 10 according to the first embodiment, the frequency domain data 15 generated by the Fourier transform from the image data 13 is stored in the storage unit 11 with first coefficients whose magnitude is below the threshold omitted. It is also possible to store the frequency domain data 16 generated by the Fourier transform from the kernel data 14 in the storage unit 11 so as to omit second coefficients corresponding to the first coefficients that were omitted from the frequency domain data 15. Accordingly, it is possible to efficiently compress the data generated by convolution and thereby reduce consumption of the storage region of the storage unit 11.

Note that the data compression method of the data compression apparatus 10 is favorable when performing inference of features in the image data 13, such as image recognition, using the feature map 17. As one example, the data compression method of the data compression apparatus 10 may be used in a convolutional layer of a convolutional neural network. During inference using the feature map 17, there is no need of strict accuracy of the convolution result, so that even when small coefficients are discarded and approximated to a predetermined value in the convolution processing, the influence on the inference result will be small.

Second Embodiment

Next, a second embodiment will be described.

An image processing apparatus 100 according to the second embodiment performs image recognition using a convolutional neural network (or "CNN") that is one type of deep neural network (or "DNN"). As examples, the image processing apparatus 100 determines whether a person appears in an image and/or whether an animal, such as a cat, appears in the image. However, the image processing method according to the second embodiment may be used in other applications, such as image searching and image classification. The image processing apparatus 100 may be a general-purpose computer or an embedded system. The image processing apparatus 100 may include an FPGA or dedicated circuitry.

Figure 2:
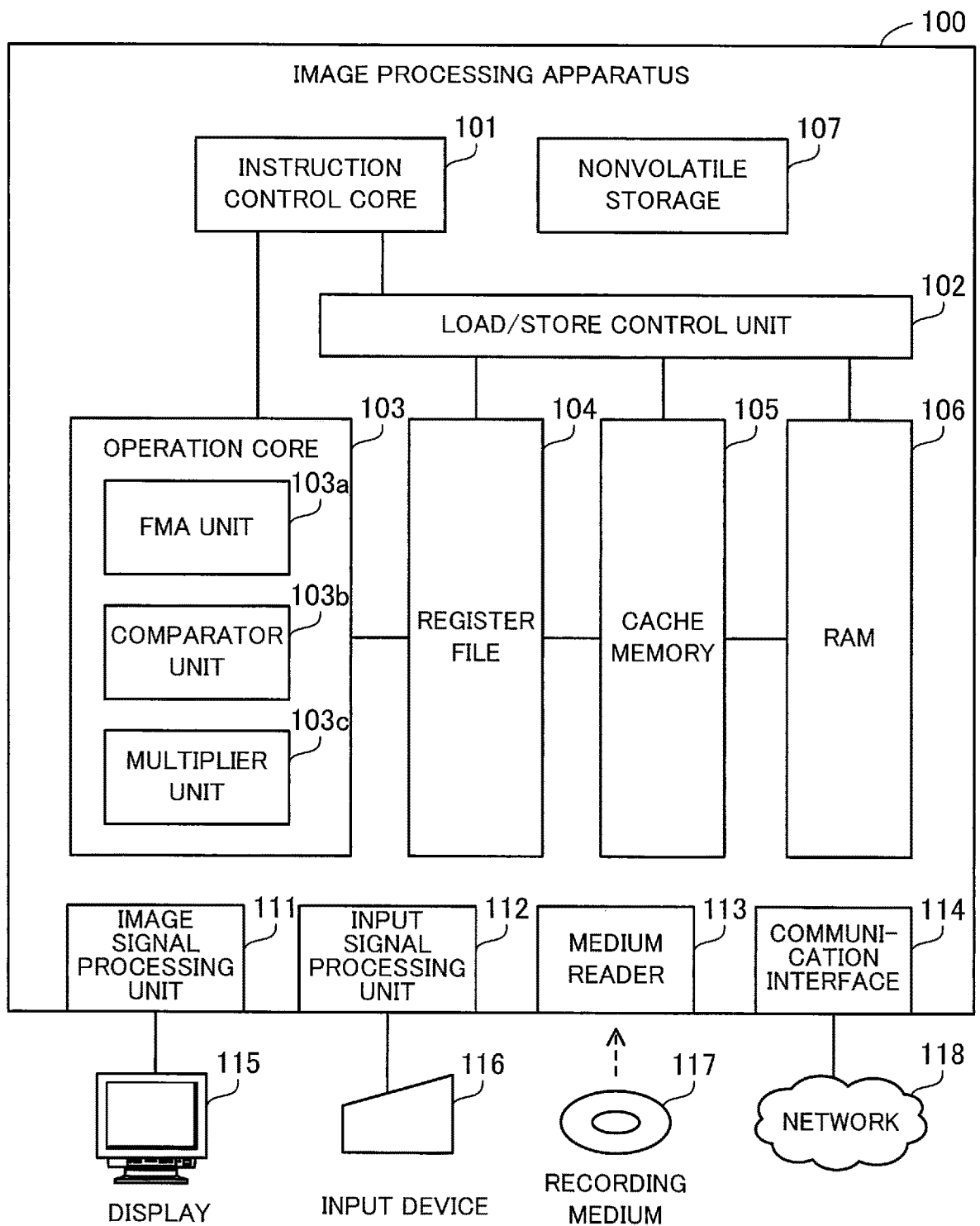
FIG. 2 is a block diagram depicting one example of an image processing apparatus according to a second embodiment.

FIG. 2 is a block diagram depicting one example of an image processing apparatus according to the second embodiment.

The image processing apparatus 100 includes an instruction control core 101, a load/store control unit 102, an operation core 103, a register file 104, a cache memory 105, a RAH 106, and nonvolatile storage 107. The image processing apparatus 100 may further include an image signal processing unit 111, an input signal processing unit 112, a medium reader 113, and a communication interface 114.

The instruction control core 101 is a processor core that executes instructions of an application program. The instruction control core 101 launches an application program stored in the nonvolatile storage 107 and controls the load/store control unit 102 and has the operation core 103 execute operations in accordance with the instructions in the application program.

The load/store control unit 102 controls data transfers between the register file 104, the cache memory 105, and the RAM 106 in accordance with instructions from the instruction control core 101. These data transfers include reads from the RAM 106 into the cache memory 105 and writes from the cache memory 105 into the RAM 106. The data transfers also include reads from the cache memory 105 into the register file 104 and writes from the register file 104 into the cache memory 105.

The operation core 103 is a processor core that performs operations in accordance with instructions from the instruction control core 101. The operation core 103 has a variety of computing units. As examples, the operation core 103 has an FMA (Fused Multiply Add) unit 103a, a comparator unit 103b, and a multiplier unit 103c. The FMA unit 103a is a computing unit that executes a compound operation combining multiplication and addition. The FMA unit 103a is capable of a single-precision floating-point sum-of-products operation. The FMA unit 103a multiplies the value of a first operand and the value of a second operand and adds the value of a third operand to the multiplication result. The FMA unit 103a is capable being used for a fast Fourier transform (or "FFT") and/or an inverse fast Fourier transform (or "IFFT"). The comparator unit 103b is a computing unit that executes a comparison operation and determines whether the value of a first operand is equal to or larger than the value of a second operand. The multiplier unit 103c is a computing unit that executes multiplication and calculates the product of the value of a first operand and the value of a second operand. The operation core 103 reads the data to be used in an operation from the register file 104 and writes the operation result into the register file 104.

The register file 104 includes a plurality of registers that are volatile semiconductor memories that store data. In accordance with instructions from the load/store control unit 102, the register file 104 reads data from the cache memory 105 into a register and writes data from a register into the cache memory 105. Data is also read from registers by the operation core 103, and data is written into the registers by the operation core 103.

The cache memory 105 is a volatile semiconductor memory that stores data, and is positioned between the register file 104 and the RAM 106. The cache memory 105 has a higher data transfer speed than the RAM 106 and a lower data transfer speed than the register file 104. In accordance with instructions from the load/store control unit 102, the cache memory 105 reads data from the RAM 106 and writes data into the RAM 106.

Note that the instruction control core 101, the load/store control unit 102, the operation core 103, the register file 104, and the cache memory 105 may be included in a single processor package. Although a distinction is made in this second embodiment between the instruction control core 101 that executes instructions in an application program and the operation core 103 that performs image processing, both cores may be integrated. The respective processor cores may be referred to as "processors" and a group of a plurality of processors or a plurality of processor cores may be referred to as a "processor".

The RAM 106 is a volatile semiconductor memory that stores various data to be used in operations by the operation core 103. The RAM 106 may also store an application program to be executed by the instruction control core 101. From the viewpoint of the operation core 103, the RAM 106 may be referred to as "external memory". Data is read from the RAM 106 by the cache memory 105 and data is written into the RAM 106 by the cache memory 105.

The nonvolatile storage 107 stores an application program to be executed by the instruction control core 101. As the nonvolatile storage 107, it is possible to use a variety of storage apparatuses, such as a ROM (Read Only Memory), flash memory, or a hard disk drive (HDD). The nonvolatile storage 107 may also store data to be loaded into the SAM 106.

When a display 115 is connected to the image processing apparatus 100, the image signal processing unit 111 displays a screen on the display 115. The display 115 may be integrally formed with the image processing apparatus 100. As the display 115, it is possible to use a variety of displays, such as a cathode ray tube (CRT) display, a liquid crystal display (LCD), a plasma display, and an organic electroluminescence (OEL) display.

When an input device 116 is connected to the image processing apparatus 100, the input signal processing unit 112 acquires an input signal from the input device 116. The input device 116 may be integrally formed with the image processing apparatus 100. As the input device 116, it is possible to use a variety of input devices, such as a mouse, a touch panel, a touchpad, a trackball, a keyboard, a remote controller, and button switches.

The medium reader 113 is a reader apparatus that reads out programs and data recorded on a recording medium 117. As the recording medium 117, it is possible to use a variety of recording media, such as a magnetic disk like a flexible disc (FD) or HDD, an optical disc like a compact disc (CD) or digital versatile disc (DVD), a magneto-optical (MO) disk, and a semiconductor memory. As one example, the medium reader 113 copies a program and/or data read out from the recording medium 117 into the RAM 106 or the like.

The communication interface 114 is an interface that is connected to a network 118 and communicates with another apparatus via the network 118. The communication interface 114 may be a wired communication interface connected by a cable to a communication device such as a switch or may be a wireless communication interface connected by a wireless link to a base station.

Next, the convolutional neural network will be described.

Figure 3:
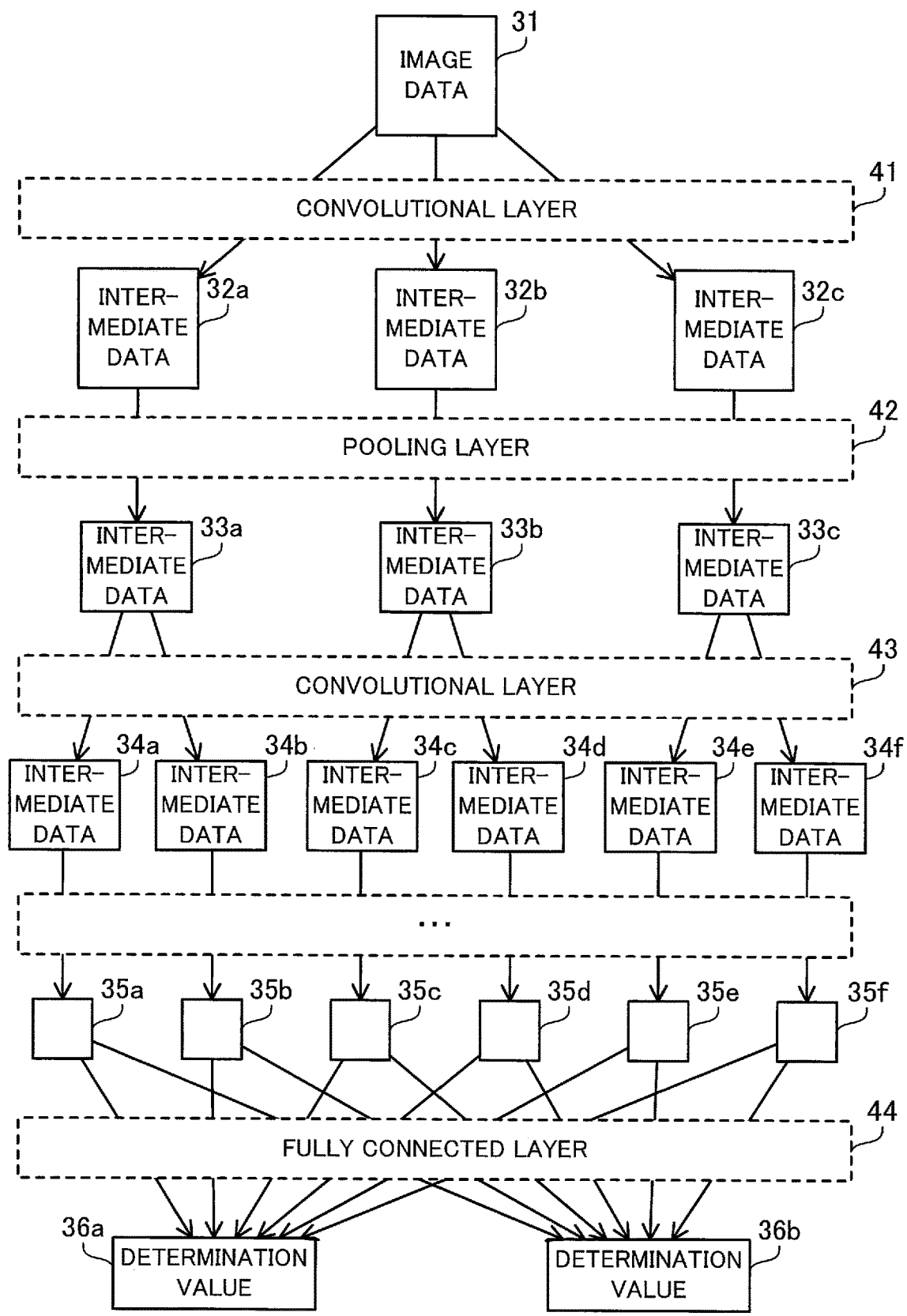
FIG. 3 depicts an example of a convolutional neural network.

FIG. 3 depicts an example of a convolutional neural network.

A convolutional neural network used for image processing is a network in which a plurality of processing layers, such as a convolutional layer, a pooling layer, and a fully connected layer are arranged in series, and has an effect that corresponds to human vision. Processing layers accept the processing result of the preceding processing layer as an input and output a processing result to the next processing layer. However, the input of the first processing layer is the original image data and the output of the final processing layer is a determination value. The image processing apparatus 100 according to the second embodiment inputs an image generated by an image capture apparatus, such as a vehicle-mounted camera, into the convolutional neural network and acquires a determination value indicating the probability that a specified type of object, such as a person or a cat, appears in the image. As one example, the larger the determination value calculated by a given procedure, the higher the determined probability that a person appears in the acquired image. The image processing apparatus 100 is capable of determining the type of objects appearing in the image based on the determination values.

The image data inputted into the convolutional neural network represents a square image whose size is N×N. As one example, the size of the image data is 244×244. The respective elements in the image data are specified by a pair of an x coordinate and a y coordinate. Each element in the image data is a numerical value where the levels of 256 tones are expressed using single-precision floating-point values. When the image data is grayscale data, the number of sets of image data inputted at a time (that is, the number of input channels) is one. Conversely, when the image data is RGB (Red Green Blue) color data, the number of input channels is three.

The convolutional layer applies a kernel, which has been prepared in advance corresponding to a feature to be extracted from an image, to the input data to generate a feature map. Convolution may be referred to as filtering using a kernel. As one example, by using a kernel for extracting edges, edges are detected from the image data. Here, a feature map in which elements corresponding to positions that have a high probability of being edges have large values is generated. In the second embodiment, the kernel size is smaller than the input data size and the feature map size is the same as the input data size. The respective elements in the kernel and the feature map are specified by a pair of an x coordinate and a y coordinate.

When there are a plurality of features to be extracted, a plurality of kernels are provided. In the convolutional layer, a plurality of kernels may be independently applied to a single set of input data to generate a plurality of feature maps. As one example, around 100 kernels may be provided. Accordingly, the number of feature maps may be much larger than the number of sets of input data. A convolution operation that uses image data and a kernel is described in detail later.

In the pooling layer, the size of output data that has been generated by a processing layer, such as the convolutional layer, is reduced without rough features being lost. As one example, a predetermined number of adjacent elements (as examples, 2×2 or 3×3 elements) in a feature map generated by the convolutional layer are regarded as a group and the elements in a group are converted to a single element. As the elements after conversion, conceivable methods include using a maximum value out of the grouped elements and using an average value of the grouped elements. In the fully connected layer, output data that has been sufficiently reduced by repeating the convolutional layer and the pooling layer is regarded as a one-dimensional data string, and a determination value is calculated as a scalar value from the data string by a predetermined calculation method.

The convolutional neural network depicted as one example in FIG. 3 includes convolutional layers 41 and 43, a pooling layer 42, and a fully connected layer 44. The convolutional layer 41 acquires image data 31. The convolutional layer 41 applies different kernels to the image data 31 to generate intermediate data 32a, 32b, and 32c. From the viewpoint of the convolutional layer 41, the intermediate data 32a, 32b, and 32c correspond to feature maps. The pooling layer 42 acquires the intermediate data 32a, 32b, and 32c. The pooling layer 42 converts the intermediate data 32a to intermediate data 33a of a reduced size, converts the intermediate data 32b to intermediate data 33b of a reduced size, and converts the intermediate data 32c to intermediate data 33c of a reduced size.

The convolutional layer 43 acquires the intermediate data 33a, 33b, and 33c. The convolutional layer 43 applies different kernels to the intermediate data 33a to generate intermediate data 34a and 34b. In the same way, the convolutional layer 43 applies different kernels to the intermediate data 33b to generate intermediate data 34c and 34d, and applies different kernels to the intermediate data 33c to generate intermediate data 34e and 34f. From the viewpoint of the convolutional layer 43, the intermediate data 33a, 33b, and 33c correspond to image data and the intermediate data 34a, 34b, 34c, 34d, 34e, and 34f correspond to feature maps. After this, by repeating convolutional layers, pooling layers, and the like, the intermediate data 35a, 35b, 35c, 35d, 35e, and 35f are generated.

The fully connected layer 44 acquires the intermediate data 35a, 35b, 35c, 35d, 35e, and 35f and regards the data as a one-dimensional data string. The fully connected layer 44 performs a predetermined operation, such as addition and subtraction, on the intermediate data 35a, 35b, 35c, 35d, 35e, and 35f to calculate a determination value 36a. The fully connected layer 44 also performs a different predetermined operation to the determination value 36a on the intermediate data 35a, 35b, 35c, 35d, 35e, and 35f to calculate a determination value 36b.

Next, the processing of a convolutional layer will be described.

Figure 4:
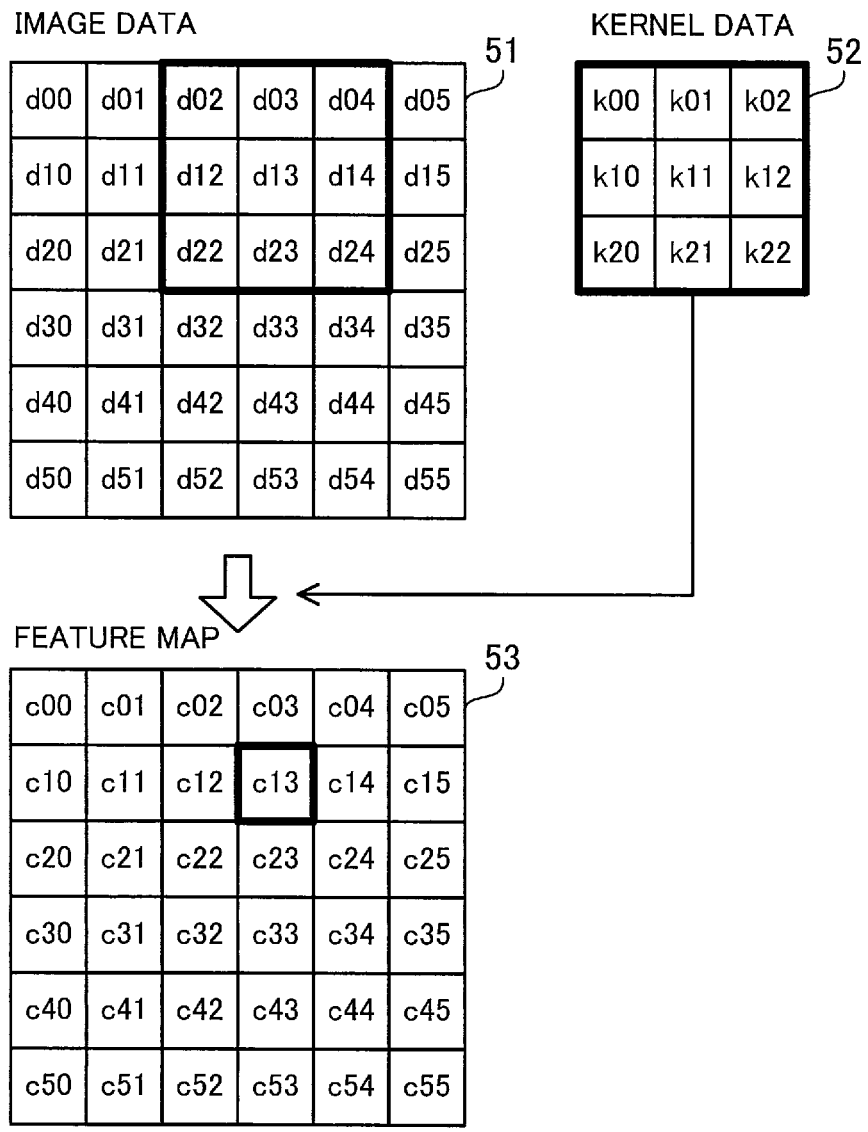
FIG. 4 depicts one example of a first convolution method.

FIG. 4 depicts one example of a first convolution method.

The first convolution, method is a fundamental computation method based on the definition of convolution. On the convolutional layer, consider the application of kernel data 52 to image data 51 to generate a feature map 53. For ease of explanation in FIG. 4, the size of the image data 51 and the feature map is set at 6×6 and the size of the kernel data 52 is set at 3×3. The image data 51 includes elements d00 to d55, the kernel data 52 includes elements k00 to k22, and the feature map 53 includes elements c00 to c55. The upper left in the image data 51 is the origin, the downward direction from the origin of the image data 51 is the x axis, and the rightward direction from the origin of the image data 51 is the y axis.

In the first convolution method, one element in the image data 51 is selected and a region that is the same size as the kernel data 52 and is centered on the selected element of the image data 51 is extracted. Next, a sum-of-products operation that multiplies elements at the same positions in the extracted region and the kernel data 52 and sums the multiplication results is performed. The numerical value calculated by the sum-of-products operation is the value of the element in the feature map 53 with the same coordinates as the center element selected from the image data 51.

As one example, when the element d13 in the image data 51 is selected, the elements d02, d03, d04, d12, d13, d14, d22, d23, and d24 are extracted from the image data 51. The element c13 of the feature map 53 corresponding to the element d13 is calculated as d02×k00+d03×k01+d04×k02+d12×k10+d13×k11+d14×k12+d22×k20+d23×k21+d24×k22. Note that elements at the edges of the feature map 53 are calculated by padding the periphery of the image data 51 with zeros.

Figure 5:
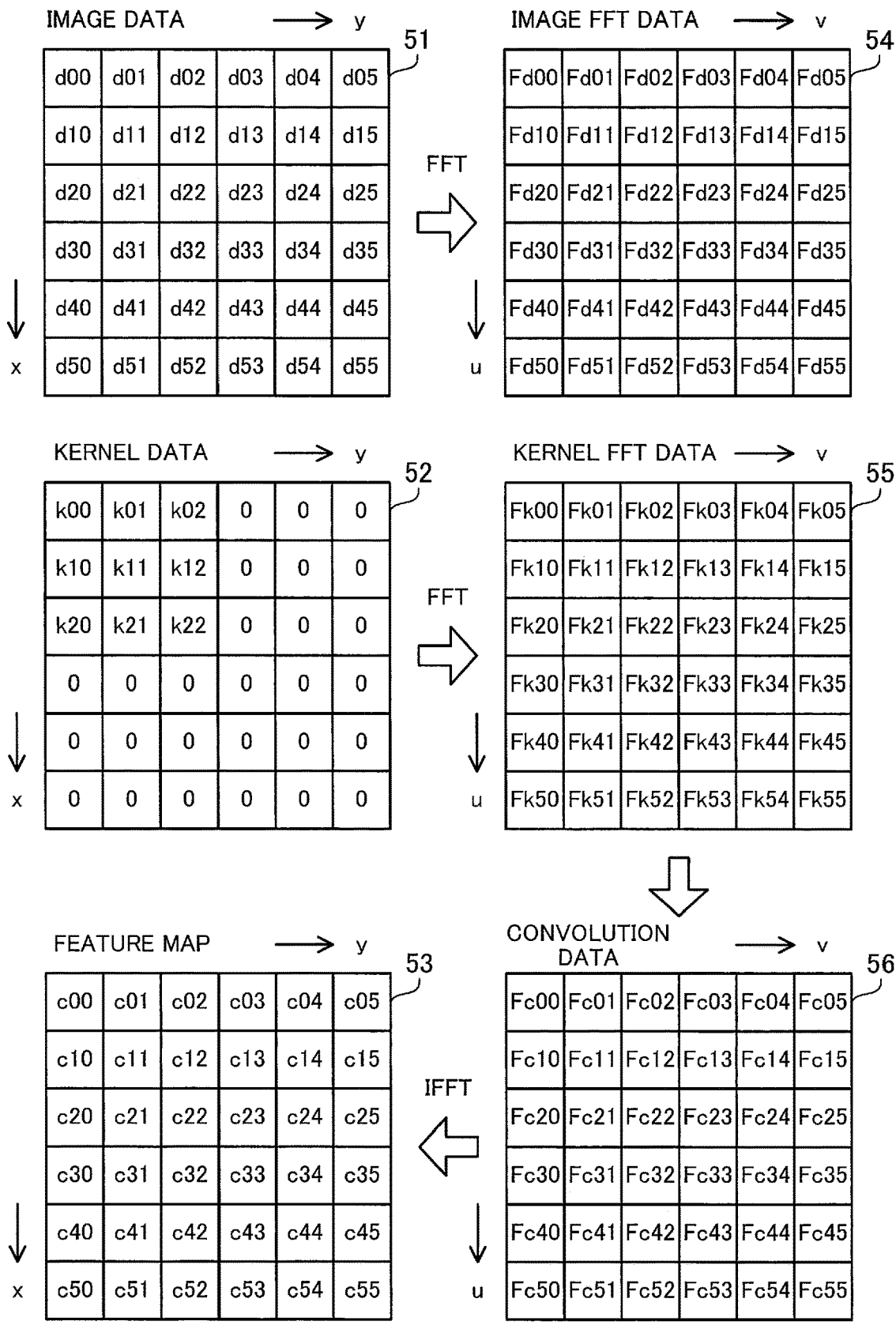
FIG. 5 depicts one example of a second convolution method.

FIG. 5 depicts one example of a second convolution method.

The second convolution method is an alternative computation method that uses a Fourier transform. In the same way as FIG. 4, on the convolutional layer, consider the application of the kernel data 52 to the image data 51 to generate the feature map 53. When the second convolution method is precisely executed, according to the convolution theorem, it is possible to generate the same feature map 53 as the first convolution method.

In the second convolution method, by performing an FFT on the image data 51 in the spatial domain, image FFT data 54 in the frequency domain is generated. In the second embodiment, the size of the image FFT data 54 is the same as the size of the image data 31. Also, by performing an FFT on the kernel data 52 in the spatial domain, kernel FFT data 55 in the frequency domain is generated. However, before the FFT, the size of the kernel data 52 is expanded to N×N that is the same as the image data 51. When expanding the size, elements whose value is zero are added to the sides with larger x coordinates and y coordinates. In this second embodiment, the size of the kernel FFT data 55 is the same as the image data 51.

The respective elements of the image FFT data 54 and the kernel FFT data 55 are specified by a pair of a u coordinate and a v coordinate. The upper left is the origin, the downward direction from the origin is the u axis, and the rightward direction from the origin is the v axis. The respective elements of the image FFT data 54 and the kernel FFT data 55 are complex numbers representing coefficients of the frequency components. Elements closer to the origin represent frequency components of lower frequencies, and elements further from the origin represent frequency components of higher frequencies.

In the frequency domain, convolution data 56 is generated by multiplying corresponding elements in the image FFT data 54 and the kernel FFT data 55. The size of the convolution data 56 is the same as the size of the image data 51. Unlike the first convolution method, it is not needed to perform a sum-of-products operation that sums the multiplication results in a certain range. The image FFT data 54 includes elements Fd00 to Fd55, the kernel FFT data 55 includes elements Fk00 to Fk55, and the convolution data 56 includes elements Fc00 to Fc55. Fc00=Fd00×Fk00, Fc01=Fd01×Fk01, Fc02=Fd02×Fk02, . . . is calculated. By performing an IFFT on the convolution data 56 in the frequency domain, the feature map 53 in the spatial domain is generated.

The Fourier transform from the image data 51 to the image FFT data 54 is defined as in Expression (1). d(x,y) is an element in the image data 51, and Fd(u,v) is an element (coefficient) in the image FFT data 54. The Fourier transform from the kernel data 52 to the kernel FFT data 55 is defined as in Expression (2). k(x,y) is an element in the kernel data 52, and Fk(u,v) is an element (coefficient) in the kernel FFT data 55. The convolution data 56 is defined as in Expression (3). Fc(u,v) is an element (coefficient) in the convolution data 56. The inverse Fourier transform from the convolution data 56 to the feature map 53 is defined as in Expression (4). c(x,y) is an element In the feature map 53.

$$Fd(u, v) = \sum_y \left( \sum_x d(x, y)\exp(-i2\pi ux/N) \right)\exp(-i2\pi vy/N) \quad (1)$$

$$Fk(u, v) = \sum_y \left( \sum_x k(x, y)\exp(-i2\pi ux/N) \right)\exp(-i2\pi vy/N) \quad (2)$$

$$Fc(u, v) = Fd(u, v) \times Fk(u, v) \quad (3)$$

$$c(x, y) = F^{-1}(Fc(u, v)) \quad (4)$$
$$= \sum_v \left( \sum_u Fc(u, v)\exp(i2\pi ux/N) \right)\exp(i2\pi vy/N)$$

By using an FFT as the Fourier transform, the amount of calculation is reduced from $O(N^2)$ to $O(N \times \log N)$. In the FFT, butterfly computations are repeatedly executed as in Expression (5). The function W(a,N) is defined as in Expression (6). The argument N is determined by the size of the image data 51. The argument a corresponds to ux or vy in Expression (1) and Expression (2). When the values of the function W(a,N) are provided in advance as parameters for various values of a and N, the FFT may be executed efficiently. It is also possible to reduce the amount of calculation by using an IFFT as the inverse Fourier transform. In the IFFT, butterfly computation is repeatedly executed in the same way as an FFT. However, in place of the function W(a,N), the function $W^{-1}(a,N)$ is used as in Expression (7). The argument a corresponds to ux or vy in Expression (4). When the values of the function $W^{-1}(a,N)$ are provided in advance as parameters for various values of a and N, the IFFT may be executed efficiently.

$$Z(a)=z(a)+W(a, N) \times z(a+N/2) \quad (5)$$

$$Z(a+N/2)=z(a)-W(a, N) \times z(a+N/2)$$

$$W(a, N)=\exp(-i2\pi a/N) \quad (6)$$

$$W^{-1}(a,N)=\exp(i2\pi a/N) \quad (7)$$

A problem for the second convolution method will now be described. With the second convolution method, the image FFT data 54, the kernel FFT data 55, and the convolution data 56, which are used only during the convolutional layer, are generated. The kernel data 52 is also expanded to N×M, which is the same size as the image data 51. In the convolutional layer of a convolutional neural network, the number of input channels and the number of output channels nay become huge. This results in a large amount of memory being consumed and the risk of a drop in processing efficiency due to memory capacity becoming a bottleneck. This is an especially large problem for an embedded system chat has a small memory capacity.

Here, the image processing apparatus 100 according to the second embodiment reduces the amount of data in the image FFT data 54, the kernel FFT data 55, and the convolution data 56. The image processing apparatus 100 approximates elements with small absolute values out of the elements of the image FFT data 54 to zero and does not store elements with a value of zero in the memory. Since the absolute values of elements on the high frequency side are often sufficiently small, these values are often approximated to zero. In addition, out of the elements of the kernel FFT data 55 and the convolution data 56, the image processing apparatus 100 does not store elements corresponding to elements of the image FFT data 54 whose values have been approximated to zero in the memory. During generation of the kernel FFT data 55 and the convolution data 56, calculation itself of these elements may be omitted.

When the amount of data has been reduced as described above, the generated feature map will not match the solution generated by the fundamental method. However, the convolutional neural network is configured with a pooling layer placed after a convolutional layer, in keeping with the objective of recognizing (inferring) features of the image. This means that even when an approximate solution is generated without a precise solution being generated in the convolutional layer, the influence on the overall accuracy of the convolutional neural network will be small. For this reason, by carrying out approximation processing when the FFT is performed, the image processing apparatus 100 efficiently suppresses consumption of memory.

Next, the functions and data structures of the image processing apparatus 100 will be described.

Figure 6:
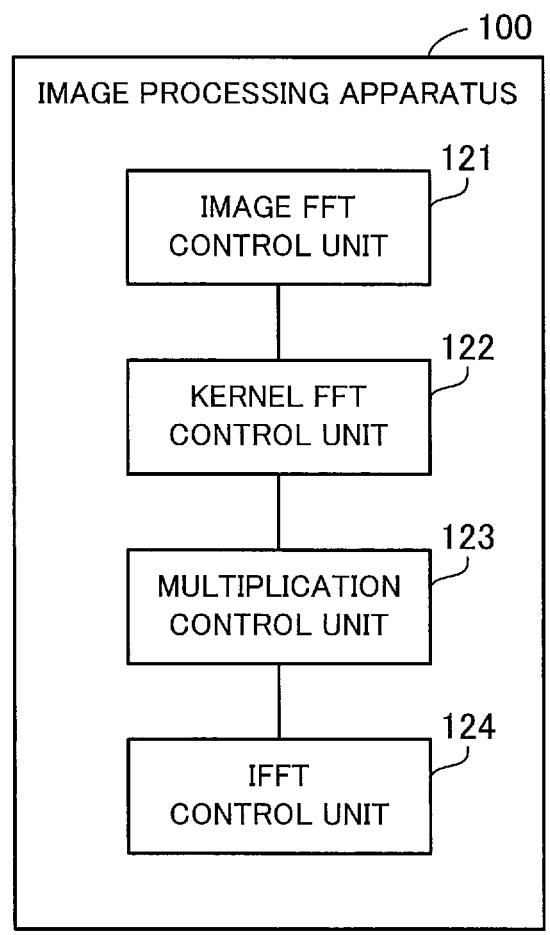
FIG. 6 is a block diagram depicting example functions of an application program.

FIG. 6 is a block diagram depicting example functions of an application program.

The image processing apparatus 100 includes an image FFT control unit 121, a kernel FFT control unit 122, a multiplication control unit 123, and an IFFT control unit 124. The image FFT control unit 121, the kernel FFT control unit 122, the multiplication control unit 123, and the IFFT control unit 124 are realized by the instruction control core 101 executing instructions of an application program.

The image FFT control unit 121 controls the conversion of image data into image FFT data by an FFT. Using the load/store control unit 102, the image FFT control unit 121 transfers the image data stored in the RAM 106 to the cache memory 105, and further transfers the image data from the cache memory 105 to the register file 104. The image FFT control unit 121 has the FMA unit 103a of the operation core 103 execute an FFT on the image data.

Next, the image FFT control unit 121 uses the comparator unit 103b of the operation core 103 to determine whether the absolute value of each coefficient after the FFT is equal to or larger than a threshold. The threshold may be stored in the RAM 106. Using the load/store control unit 102, the image FFT control unit 121 has coefficients whose absolute values are equal to or larger than the threshold transferred from the register file 104 to the cache memory 105 and further transferred from the cache memory 105 to the RAM 106. On the other hand, the image FFT control unit 121 does not transfer coefficients whose absolute values are below the threshold to the RAM 106. By doing so, image FFT data from which some coefficients have been omitted is stored in the RAM 106.

The kernel FFT control unit 122 controls conversion of kernel data into kernel FFT data by an FFT. The kernel FFT control unit 122 uses the load/store control unit 102 to transfer the kernel data stored in the RAM 106 to the cache memory 105, and further transfers the kernel data from the cache memory 105 to the register file 104. The kernel FFT control unit 122 has the FMA unit 103a execute an FFT on the kernel data.

The kernel FFT control unit 122 suppresses calculation of coefficients in the kernel FFT data corresponding to the coefficients of the image FFT data that were not stored in the RAM 106. This is because the omitted coefficients in the image FFT data are regarded as zero, so that the multiplication result for the coefficients will always be zero. The kernel FFT control unit 122 may have only elements related to coefficients in the kernel FFT data that are to be calculated read out from the kernel data stored in the RAM 106. The kernel FFT control unit 122 has only coefficients of the kernel FFT data corresponding to coefficients of the image FFT data that have not been omitted transferred from the register file 104 to the cache memory 105 and further transferred from the cache memory 105 to the RAM 106. By doing so, kernel FFT data from which some coefficients have been omitted is stored in the RAM 106.

The multiplication control unit 123 performs control over simple multiplication of the image FFT data and the kernel FFT data stored in the RAM 106 and thereby generates convolution data. The multiplication control unit 123 uses the load/store control unit 102 to transfer the image FFT data and the kernel FFT data stored in the RAM 106 to the cache memory 105 and further transfer the image FFT data and the kernel FFT data from the cache memory 105 to the register file 104. The multiplication control unit 123 uses the multiplier unit 103c of the operation core 103 to multiply corresponding coefficients in the data.

Coefficients with low absolute values are omitted in the image FFT data that is read out, and coefficients corresponding to coefficients omitted in the image FFT data are omitted in the kernel FFT data that is read out. This means that out of the coefficients in the convolution data, coefficients corresponding to coefficients omitted from the image FFT data are not calculated. The multiplication control unit 123 uses the load/store control unit 102 to transfer the coefficients in the calculated convolution data from the register file 104 to the cache memory 105 and further from the cache memory 105 to the RAM 106. By doing so, convolution data from which some coefficients have been omitted is stored in the RAM 106.

The IFFT control unit 124 performs control to convert the convolution data to a feature map by an IFFT. The IFFT control unit 124 uses the load/store control unit 102 to transfer the convolution data stored in the RAM 106 to the cache memory 105 and further from the cache memory 105 to the register file 104. The IFFT control unit 124 uses the FMA unit 103a to execute an IFFT on the convolution data. When doing so, coefficients omitted from the convolution data are treated as zeros. The IFFT control unit 124 uses the load/store control unit 102 to transfer the elements of the feature map from the register file 104 to the cache memory 105 and further from the cache memory 105 to the RAM 106. By doing so, an approximate solution for the feature map is stored in the RAM 106.

Figure 7:
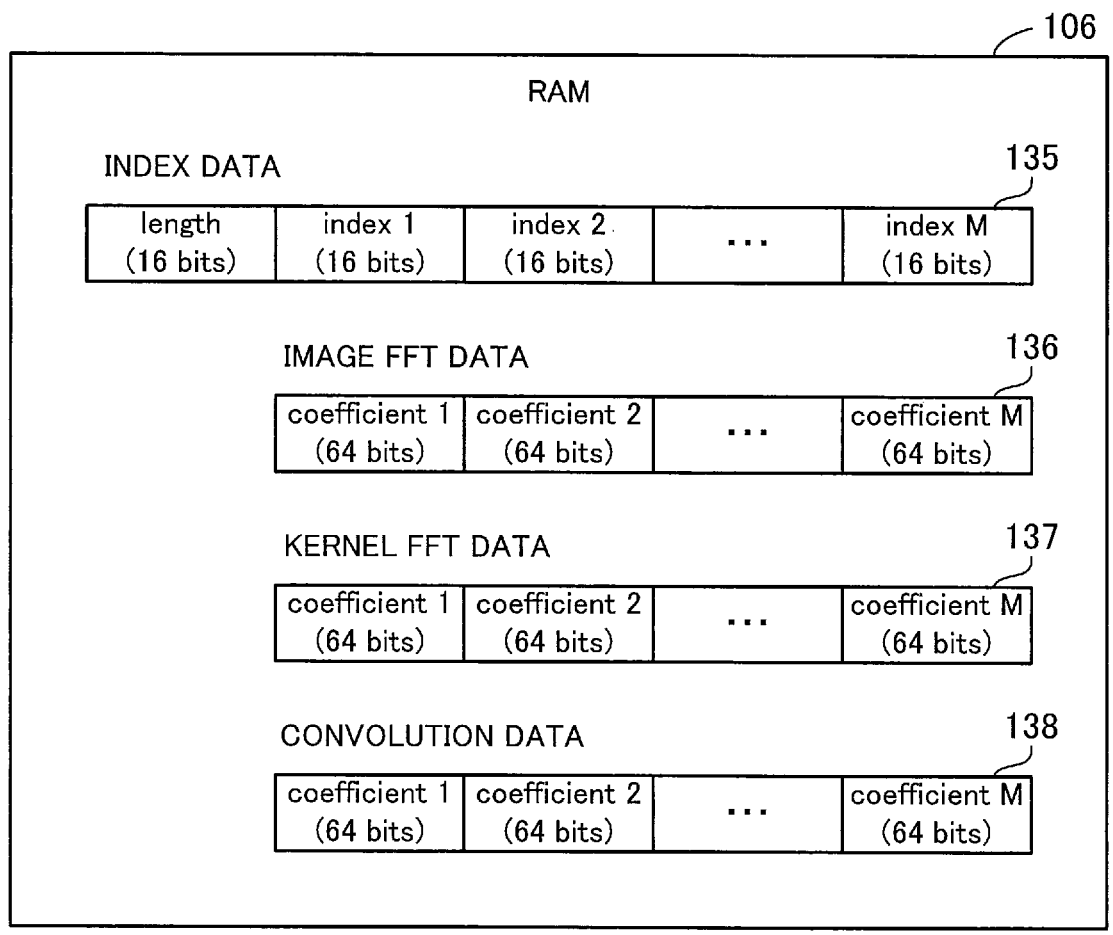
FIG. 7 is a first diagram depicting an example data structure.

FIG. 7 is a first diagram depicting an example data structure.

The RAM 106 stores index data 135, image FFT data 136, kernel FFT data 137, and convolution data 138.

The index data 135 includes an index with a "length" that is "1" or greater. The length indicates the number of indices included in the index data 135. As one example, the length is expressed using 16 bits. An index represents the coordinates (u,v) of a frequency domain for which the coefficient has not been omitted. As one example, each index is expressed using 16 bits. Out of the 16 bits in an index, the u coordinate part is eight bits and the v coordinate part is eight bits. Note that after a feature map has been generated, the index data 135 may be deleted from the RAM 106.

The image FFT data 136 includes one or more coefficients corresponding to the one or more indices in the index data 135. Each coefficient is a coefficient whose absolute value is equal to or greater than a threshold. As one example, each coefficient is represented by a single-precision floating-point complex number expressed by 64 bits. Out of the 64 bits of the coefficient, the real part is 32 bits and the imaginary part is 32 bits. Note that after the convolution data 138 has been generated, the image FFT data 136 may be deleted from the RAM 106.

The kernel FFT data 137 includes one or more coefficients that correspond to the one or more indices in the index data 135. Each coefficient has the same coordinates as a coefficient in the image FFT data 136 whose absolute value is equal to or greater than the threshold. As one example, like the image FFT data 136, each coefficient is a single-precision floating-point complex number expressed by 64 bits. Note that after the convolution data 138 has been generated, the kernel FFT data 137 may be deleted from the RAM 106.

The convolution data 138 includes one or more coefficients corresponding to the one or more indices of the index data 135. Each coefficient has the same coordinates as a coefficient of the image FFT data 136 whose absolute value is equal to or greater than the threshold. As one example, like the image FFT data 136, each coefficient is a single-precision floating-point complex number expressed by 64 bits. Note that after a feature map has been generated, the convolution data 138 may be deleted from the RAM 106.

FIG. 8 is a second diagram depicting an example data structure.

The RAM 106 stores FFT parameters 133. The FFT parameters 133 are parameters used in butterfly computations of an FFT and are provided in advance. The FFT parameters 133 are associated with the arguments a and N and the value of the function w(a,N) in Expression (6). The value of the function W(a,N) is a single-precision floating-point complex number.

IFFT parameters 134 are also stored in the RAM 106. The IFFT parameters 134 are parameters used in butterfly computations of an IFFT and are provided in advance. The IFFT parameters 134 are associated with the arguments a and N and the value of the function $W^{-1}(a,N)$ in Expression (7). The value of the function $W^{-1}(a,N)$ is a single-precision floating-point complex number.

Next, the procedure of convolution processing by the image processing apparatus 100 will be described.

Figure 9:
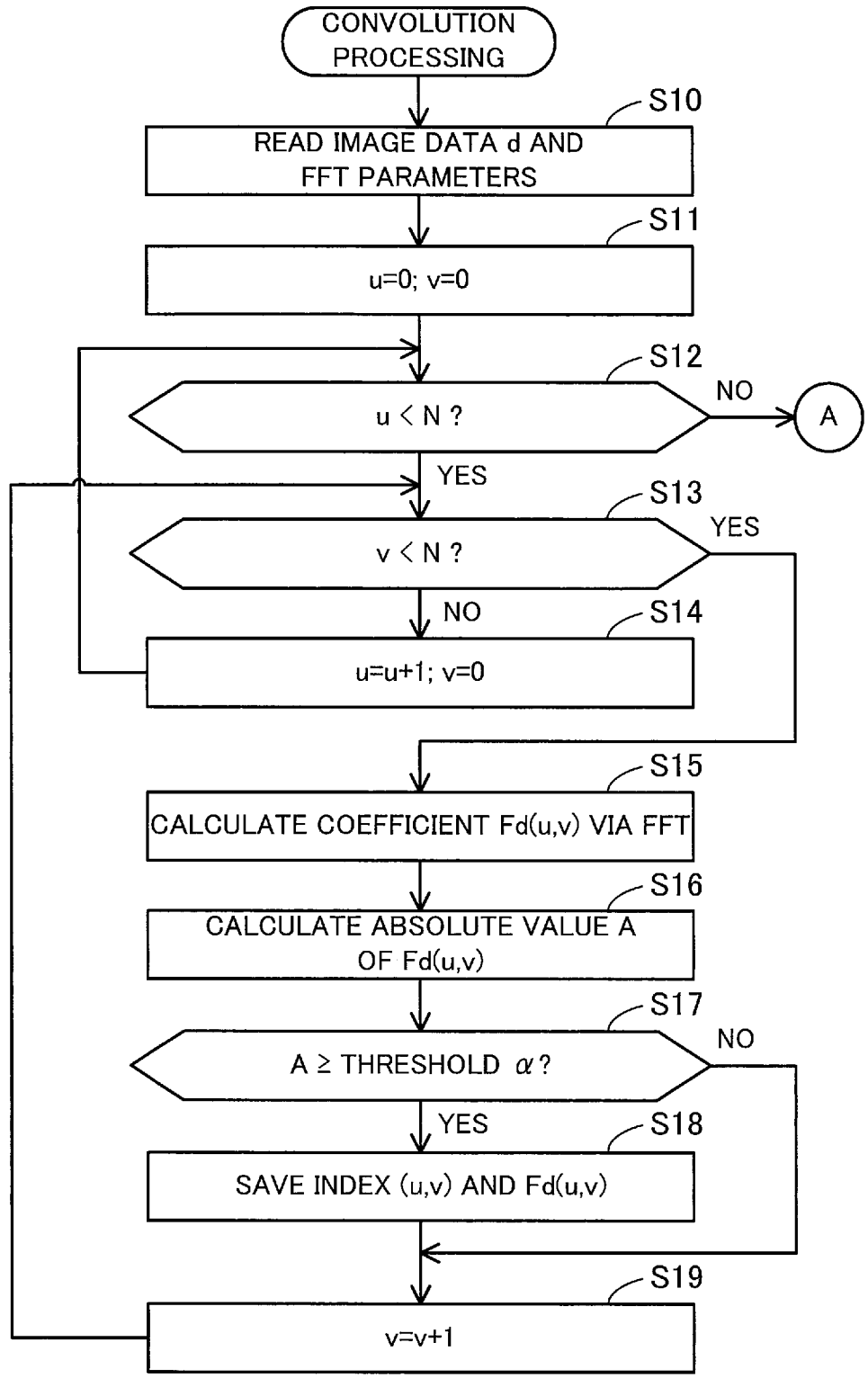
FIG. 9 is a flowchart depicting an example procedure of convolution processing.

FIG. 9 is a flowchart depicting an example procedure of the convolution processing.

(S10) The instruction control core 101 has the image data d and the FFT parameters 133 read out from the RAM 106 into the register file 104. Data to be used in the processing in the following step S15 may also be read out as appropriate.

(S11) The instruction control core 101 initializes u=0 and v=0.

(S12) The instruction control core 101 compares the u coordinate currently in focus with the length N of one side of the image data d. When u is below N (u<N), the processing proceeds to step S13, and when u is N or higher (u≥N), the processing proceeds to step S20.

(S13) The instruction control core 101 compares the v coordinate currently in focus with the length N of one side of the image data d. When v is below N (v<N), the processing proceeds to step S15, and when v is N or higher (v≥N), the processing proceeds to step S14.

(S14) The instruction control core 101 updates u to u=u+1 and initializes v=0. The processing then proceeds to step S12 for the next u coordinate.

(S15) The FMA unit 103a calculates the coefficient Fd(u,v) via a butterfly operation of an FFT using the image data d and the FFT parameters 133. The FMA unit 103a writes the calculated coefficient Fd(u,v) into the register file 104. The FMA unit 103a also writes an index (u,v) into the register file 104.

(S16) The FMA unit 103a calculates the absolute value A of the coefficient Fd(u,v). The absolute value A may be a scale expressing the size of a complex number, and may be referred to as the "length", "distance", "norm", or the like. As one example, the sum of the square of the real part and the square of the imaginary part is used as the absolute value A. Alternatively, the square root of the sum of the square of the real part and the square of the imaginary part may be used as the absolute value A. A computing unit of the operation core 103 aside from the FMA unit 103a may calculate the absolute value A.

(S17) The comparator unit 103b compares the absolute value A with a threshold α. As one example, the threshold α is adjusted in advance by testing the convolution processing on various sample images. The threshold α may be stored in the nonvolatile storage 107. The threshold α may be loaded into the RAM 106, and the instruction control core 101 may have the threshold value α read out from the RAM 106 into the register file 104. When the absolute value A is equal to the threshold value α or higher (A≥α), the processing proceeds to step S18. When the absolute value A is below the threshold α (A<α), the processing proceeds to step S19.

(S18) The instruction control core 101 has the index (u,v) and the coefficient Fd(u,v) saved from the register file 104 into the RAM 106. The index (u,v) is added to the end of the index data 135 and the coefficient Fd(u,v) is added to the end of the image FFT data 136. The length written in the index data 135 is incremented by one. Saving from the register file 104 into the RAM 106 may be performed asynchronously depending on the usage states of the register file 104 and the cache memory 105.

(S19) The instruction control core 101 updates v=v+1. The processing then proceeds to step S13 for the next v coordinate.

Figure 10:
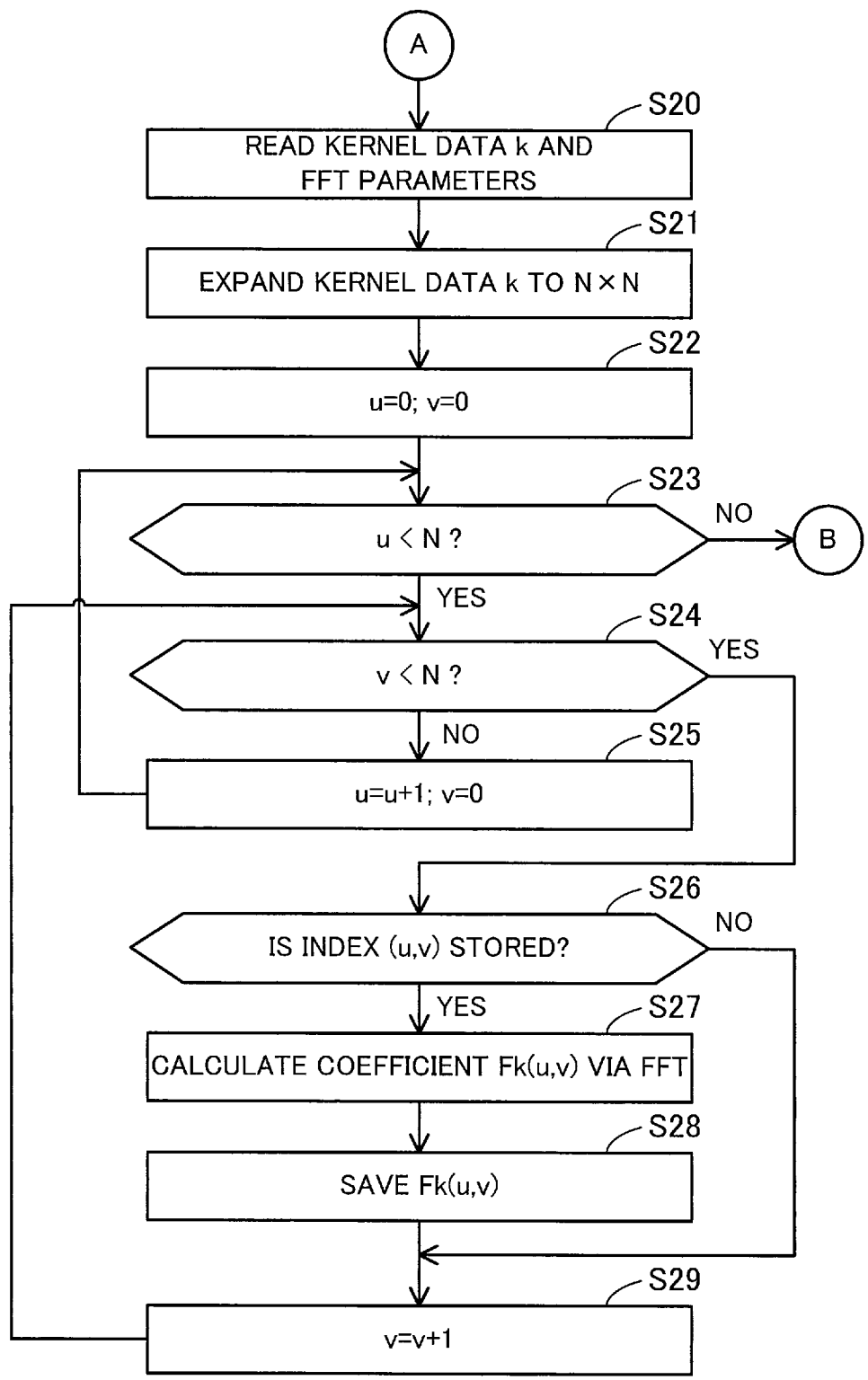
FIG. 10 is a flowchart depicting a continued part of the example procedure of the convolution processing.

FIG. 10 is a flowchart depicting a continued part of the example procedure of the convolution processing.

(S20) The instruction control core 101 has the kernel data k and the FFT parameters 133 read out from the RAM 106 into the register file 104. Data to be used in the processing in the following step S27 may also be read out as appropriate.

(S21) The operation core 103 expands the kernel data k to the same size (N×N) as the image data d. To expand the size, elements whose value is 0 are added to the sides with larger x coordinates and y coordinates.

(S22) The instruction control core 101 initializes u=0 and v=0.

(S23) The instruction control core 101 compares the u coordinate currently in focus and the length N of one side of the image data d. When u is below N (u<N), the processing proceeds to step S24 and when u is N or higher (u≥N), the processing proceeds to step S30.

(S24) The instruction control core 101 compares the v coordinate currently in focus with the length N of one side of the image data d. When v is below N (v<N), the processing proceeds to step S26, and when v is N or higher (v≥N), the processing proceeds to step S25.

(S25) The instruction control core 101 updates u=u+1 and initializes v=0. The processing then proceeds to step S23 for the next u coordinate.

(S26) The instruction control core 101 determines whether an index (u,v) is stored in the index data 135. As one example, the instruction control core 101 has the operation core 103 check whether an index (u,v) is stored, when an index is stored, the processing proceeds to step S27, and when no index is stored, the processing proceeds to step S29.

(S27) The FMA unit 103a calculates the coefficient Fk(u,v) via a butterfly computation of an FFT using the kernel data k and the FFT parameters 133. The FMA unit 103a writes the calculated coefficient Fk(u,v) into the register file 104.

(S28) The instruction control core 101 has the coefficient Fk(u,v) saved from the register file 104 into the RAM 106. The coefficient Fk(u,v) is added to the end of the kernel FFT data 137. Saving from the register file 104 into the RAM 106 may be performed asynchronously depending on the usage states of the register file 104 and the cache memory 105.

(S29) The instruction control core 101 updates v=v+1. The processing then proceeds to step S24 for the next v coordinate.

Figure 11:
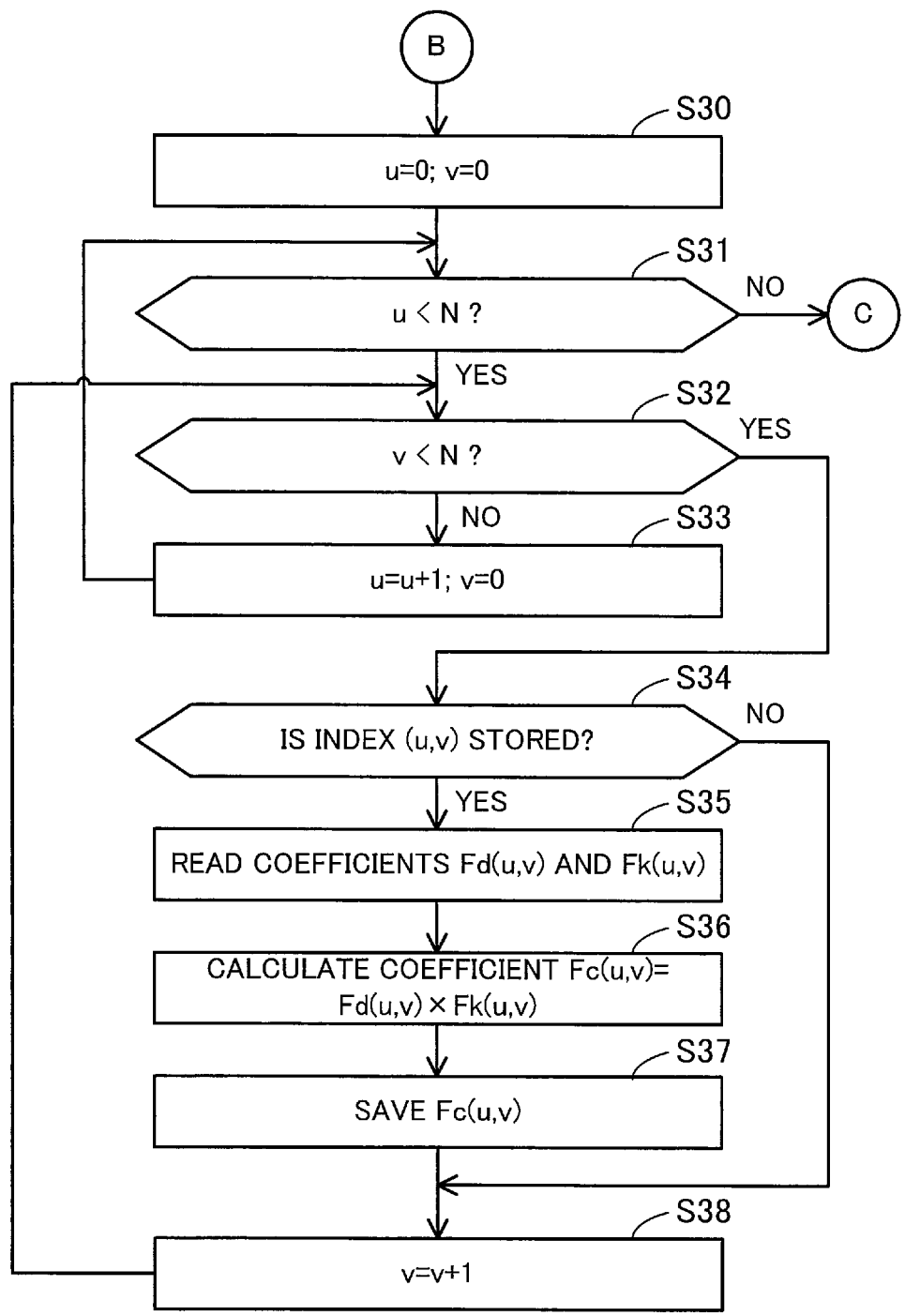
FIG. 11 is a flowchart depicting a further continued part of the example procedure of the convolution processing.

FIG. 11 is a flowchart depicting a further continued part of the example procedure of the convolution processing.

(S30) The instruction control core 101 initializes u=0 and v=0.

(S31) The instruction control core 101 compares the u coordinate currently in focus with the length N of one side of the image data d. When u is below N (u<N), the processing proceeds to step S32, and when u is N or higher (u≥N), the processing proceeds to step S39.

(S32) The instruction control core 101 compares the v coordinate currently in focus with the length N of one side of the image data d. When v is below N (v<N), the processing proceeds to step S34, and when v is N or higher (v≥N), the processing proceeds to step S33.

(S33) The instruction control core 101 updates u=u+1 and initializes v=0. The processing then proceeds to step S31 for the next u coordinate.

(S34) The instruction control core 101 determines whether an index (u,v) is stored in the index data 135. As one example, the instruction control core 101 has the operation core 103 check whether an index (u,v) is stored. When an index is stored, the processing proceeds to step S35, and when no index is stored, the processing proceeds to step S38.

(S35) The instruction control core 101 has the coefficient Fd(u,v) included in the image FFT data 136 and the coefficient Fk(u,v) included in the kernel FFT data 137 read out from the RAM 106 into the register file 104. The positions of the coefficients Fd(u,v) and Fk(u,v) may be specified from the position of the index (u,v) in the index data 135.

(S36) The multiplier unit 103c calculates the product of the coefficient Fd(u,v) and the coefficient Fk(u,v) as a coefficient Fc(u,v), and writes the coefficient Fc(u,v) into the register file 104.

(S37) The instruction control core 101 has the coefficient Fc(u,v) saved from the register file 104 to the RAM 106. The coefficient Fc(u,v) is added to the end of the convolution data 138. Saving from the register file 104 to the RAM 106 may be performed asynchronously depending on the usage states of the register file 104 and the cache memory 105.

(S38) The instruction control core 101 updates v=v+1. The processing then proceeds to step S32 for the next v coordinate.

Figure 12:
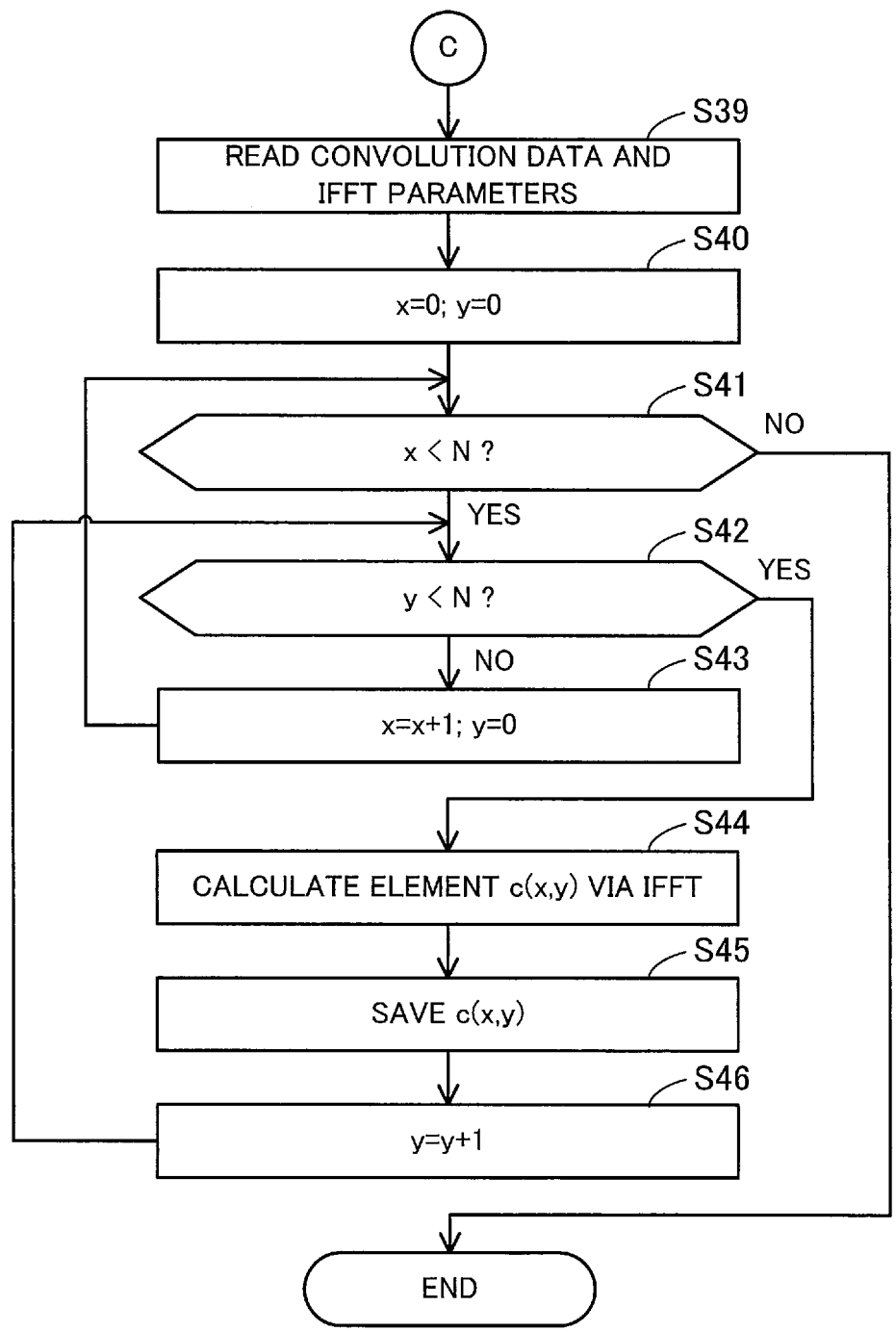
FIG. 12 is a flowchart depicting a further continued part of the example procedure of the convolution processing.

FIG. 12 is a flowchart depicting a further continued part of the example procedure of the convolution processing.

(S39) The instruction control core 101 has the convolution data 138 and the IFFT parameters 134 read out from the RAM 106 into the register file 104. Data to be used in the processing in the following step S44 may also be read out as appropriate.

(S40) The instruction control core 101 initializes x=0 and y=0.

(S41) The instruction control core 101 compares the x coordinate currently in focus with the length N of one side of the image data d. When x is below N (x<N), the processing proceeds to step S42. When x is N or higher (u≥N), the convolution processing ends.

(S42) The instruction control core 101 compares the y coordinate currently in focus with the length N of one side of the image data d. When y is below N (y<N), the processing proceeds to step S44. When y is N or higher (y≥N), the processing proceeds to step S43.

(S43) The instruction control core 101 updates x=x+1 and also initializes y=0. The process then proceeds to step S41 for the next x coordinate.

(S44) The FMA unit 103a calculates the element c(x,y) of the feature map c via a butterfly computation of an IFFT using the convolution data 138 and the IFFT parameters 134. When doing so, coefficients that are not specified in the convolution data 138 are regarded as zero. The FMA unit 103a writes the calculated element c(x,y) into the register file 104.

(S45) The instruction control core 101 has the element c(x,y) saved from the register file 104 into the RAM 106. Saving from the register file 104 into the RAM 106 may be performed asynchronously depending on the usage states of the register file 104 and the cache memory 105.

(S46) The instruction control core 101 updates y=y+1. The processing then proceeds to step S42 for the next y coordinate.

Figure 13:
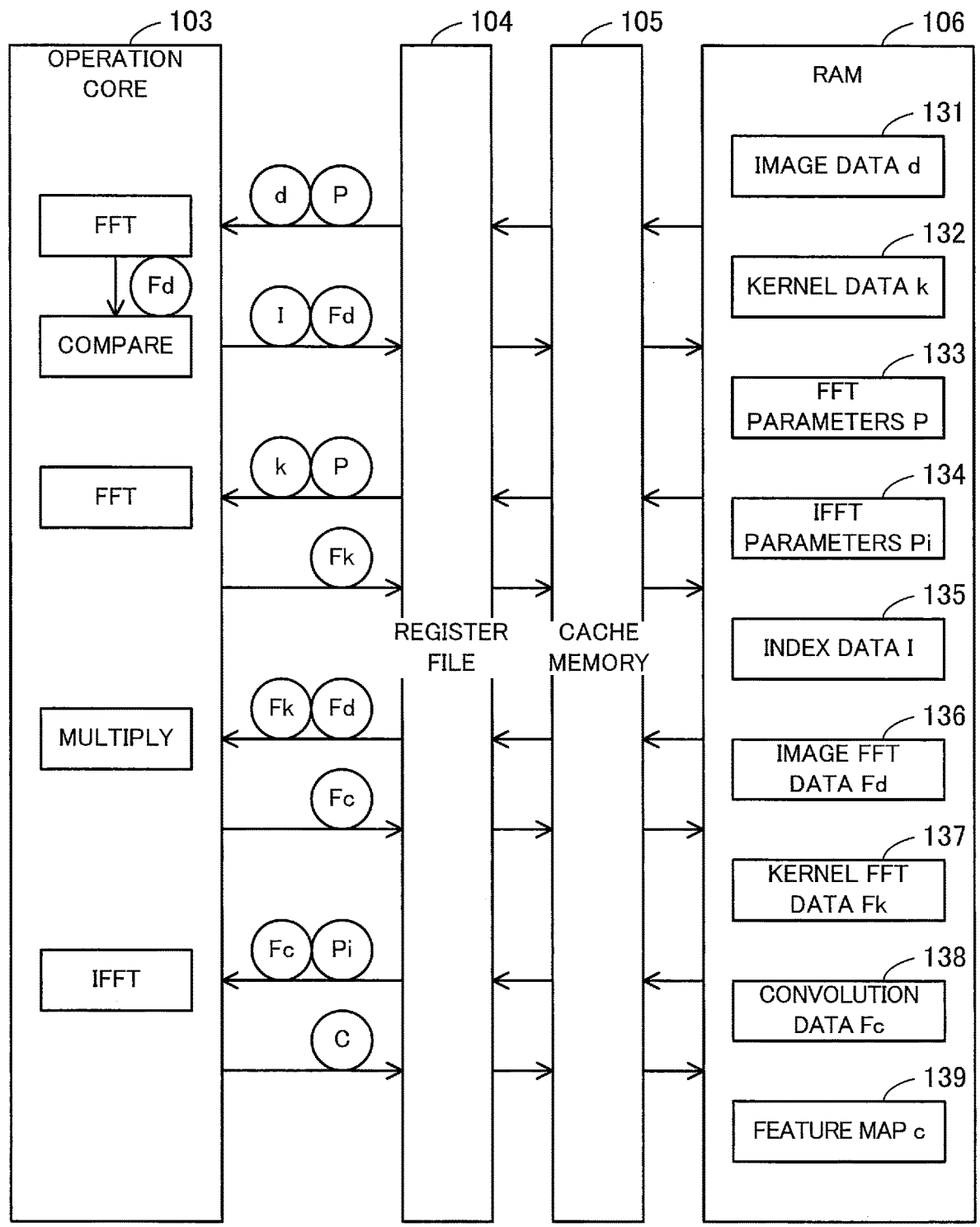
FIG. 13 depicts examples of data reads and writes.

FIG. 13 depicts examples of data reads and writes.

On the convolutional layer, the image data 131 (d), the kernel data 132 (k), the FFT parameters 133 (P), and the IFFT parameters 134 (Pi) are loaded into the RAM 106. The index data 135 (I), the image FFT data 136 (Fd), the kernel FFT data 137 (Fk), the convolution data 138 (Fc), and the feature map 139 (c) are generated and stored in the RAM 106.

The image data 131 and the FFT parameters 133 are read out from the RAM 106 via the cache memory 205 and the register file 104 to the operation core 103. At the operation core 103, an FFT is executed and the coefficients calculated by the FFT are compared with a threshold. The index data 135 and the image FFT data 136 are written from the operation core 103 via the register file 104 and the cache memory 105 into the RAM 106. Some coefficients, that is, coefficients whose absolute values are small, are omitted from the image FFT data 136.

Next, the kernel data 132 and the FFT parameters 133 are read out from the RAM 106 via the cache memory 105 and the register file 104 to the operation core 103. An FFT is executed at the operation core 103. The kernel FFT data 137 is written from the operation core 103 via the register file 104 and the cache memory 105 into the RAM 106. Some coefficients are omitted from the kernel FFT data 137.

Next, the image FFT data 136 and the kernel FFT data 137 are read out from the RAM 106 via the cache memory 105 and the register file 104 to the operation core 103. At the operation core 103, products are calculated for coefficients at the sane coordinates. The convolution data 138 is written from the operation core 103 into the RAM 106 via the register file 104 and the cache memory 105. Some coefficients are omitted from the convolution data 138. The omitted coefficients in the convolution data 138 are regarded as zero.

Next, the convolution data 138 and the IFFT parameters 134 are read out from the RAM 106 via the cache memory 105 and the register file 104 to the operation core 103. An IFFT is executed at the operation core 103. The coefficients omitted from the convolution data 138 are regarded as zeros. The feature map 139 is written from the operation core 103 via the register file 104 and the cache memory 105 into the RAM 106. The feature map 139 is output data of the convolutional layer corresponding to the image data 131.

With the image processing apparatus 100 according to the second embodiment, by performing a Fourier transform on the image data and the kernel data, a sum-of-products operation in the spatial domain is replaced by a simple multiplication in the frequency domain. This means that convolution is performed for the image data and the kernel data at high speed. Coefficients, out of the coefficients included in the image FFT data, whose absolute value is below a threshold are also approximated to zero and these coefficients that have been approximated to zero are omitted from the image FFT data. In the kernel FFT data and convolution data also, coefficients corresponding to coefficients of the image FFT data that have been approximated to zero are omitted. By doing so, it is possible to reduce the data amounts of the image FFT data, the kernel FFT data, and the convolution data that are frequency domain data. Accordingly, it is possible to reduce consumption of the RAM 106 when executing the convolutional layer.

Additionally, the image FFT data becomes compressed in the process of converting the image data to the image FFT data via an FFT, and the kernel FFT data becomes compressed in the process of converting the kernel data to the kernel FFT data by way of an FFT. By doing so, data compression is efficiently performed. When converting the kernel data to the kernel FFT data, it is possible to omit calculation itself of coefficients that are to be omitted from the kernel FFT data. In the same way, when generating the convolution data, it is possible to omit calculation itself of coefficients that are to be omitted from the convolution data. Accordingly, it is possible to reduce the amount of computation in the frequency domain.

According to the present embodiments, it is possible to reduce the amount of data to be stored during a convolution operation on an image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data compression apparatus comprising:
a memory that stores image data and kernel data to be applied to the image data; and
a processor that executes a process including:
calculating, from the image data, a plurality of first coefficients corresponding to different frequencies using a Fourier transform;
storing first frequency domain data, which indicates a subset of the plurality of first coefficients from which one or more first coefficients of a magnitude below a threshold have been excluded, in the memory;
calculating, from the kernel data, second coefficients of frequencies corresponding to the subset of the plurality of first coefficients indicated by the first frequency domain data using a Fourier transform;
storing second frequency domain data indicating the second coefficients in the memory; and
generating a feature map indicating a result of applying the kernel data to the image data using the first frequency domain data, the second frequency domain data, and an inverse Fourier transform.

2. The data compression apparatus according to claim 1, wherein the storing of second frequency domain data includes suppressing calculation of second coefficients of frequencies corresponding to the one or more first coefficients that have been excluded from the first frequency domain data.

3. The data compression apparatus according to claim 1, wherein the generating of feature map includes calculating, from the first frequency domain data and the second frequency domain data, third coefficients of frequencies corresponding to the subset of the plurality of first coefficients indicated by the first frequency domain data, storing third frequency domain data indicating the third coefficients in the memory, and generating the feature map from the third frequency domain data using an inverse Fourier transform.

4. The data compression apparatus according to claim 3, wherein the storing of third frequency domain data includes suppressing calculation of third coefficients of frequencies corresponding to the one or more first coefficients that have been excluded from the first frequency domain data.

5. The data compression apparatus according to claim 1, wherein the generating of feature map includes performing an inverse Fourier transform while regarding the one or more first coefficients that have been excluded from the first frequency domain data as a predetermined value whose magnitude is below the threshold.

6. A data compression method comprising:
calculating, by a processor, a plurality of first coefficients corresponding to different frequencies from image data using a Fourier transform, and storing first frequency domain data, which indicates a subset of the plurality of first coefficients from which one or more first coefficients of a magnitude below a threshold have been excluded, in a memory;
calculating, by the processor, second coefficients of frequencies corresponding to the subset of the plurality of first coefficients indicated by the first frequency domain data from kernel data, which is to be applied to the image data, using a Fourier transform, and storing second frequency domain data indicating the second coefficients in the memory; and
generating, by the processor, a feature map, which indicates a result of applying the kernel data to the image data, using the first frequency domain data, the second frequency domain data, and an inverse Fourier transform.

7. A non-transitory computer-readable storage medium storing a computer program that causes a computer to execute a process comprising:
calculating a plurality of first coefficients corresponding to different frequencies from image data using a Fourier transform, and storing first frequency domain data, which indicates a subset of the plurality of first coefficients from which one or more first coefficients of a magnitude below a threshold have been excluded, in a memory of the computer;

calculating second coefficients of frequencies corresponding to the subset of the plurality of first coefficients indicated by the first frequency domain data from kernel data, which is to be applied to the image data, using a Fourier transform, and storing second frequency domain data indicating the second coefficients in the memory; and generating a feature map, which indicates a result of applying the kernel data to the image data, using the first frequency domain data, the second frequency domain data, and an inverse Fourier transform.

\* \* \* \* \*